R. W. ROMIG.
AUTOMATIC CUT-OFF FOR WEIGH SCALES.
APPLICATION FILED JULY 16, 1907.
940,616.
Patented Nov. 16, 1909.
2 SHEETS—SHEET 1.
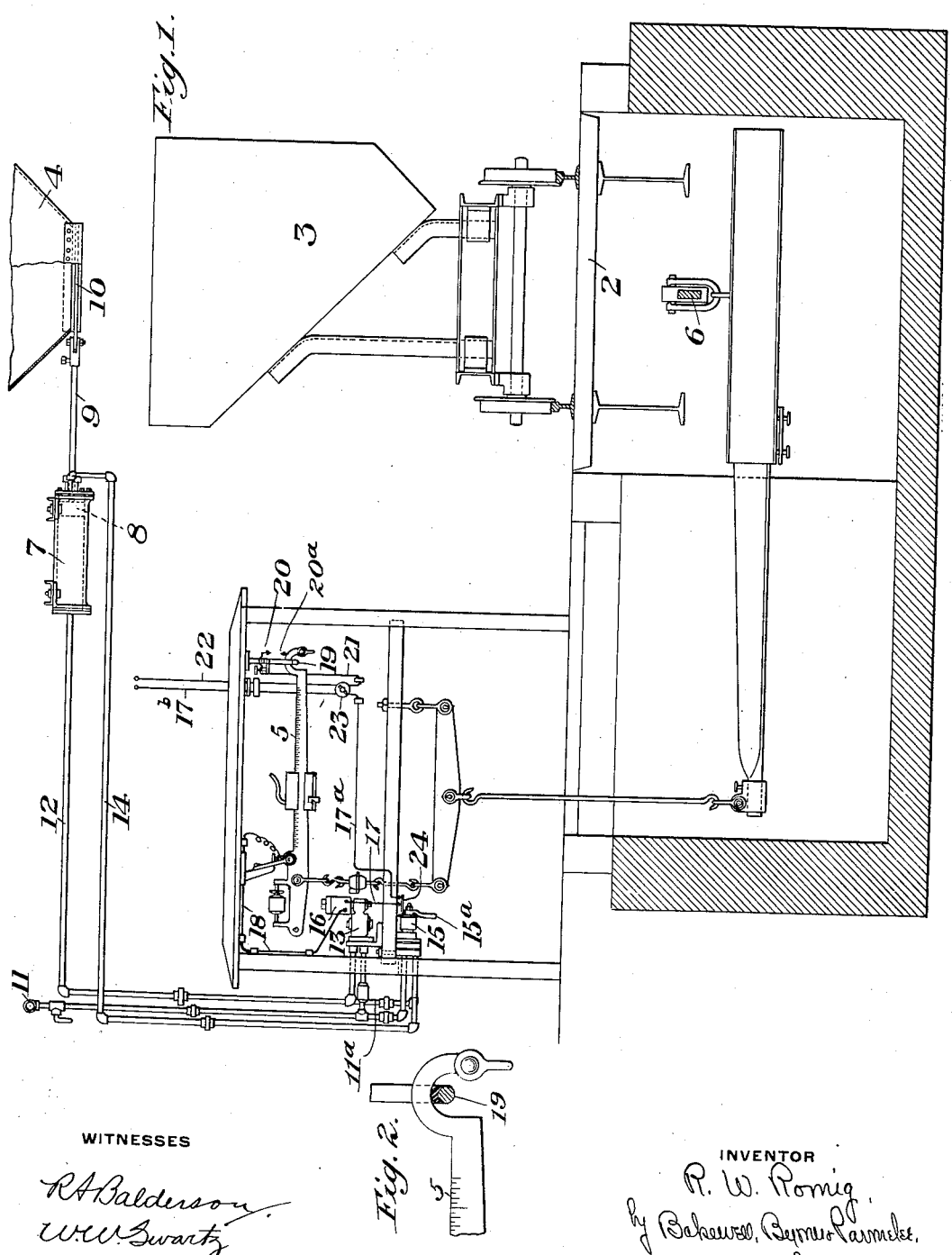
WITNESSES
INVENTOR

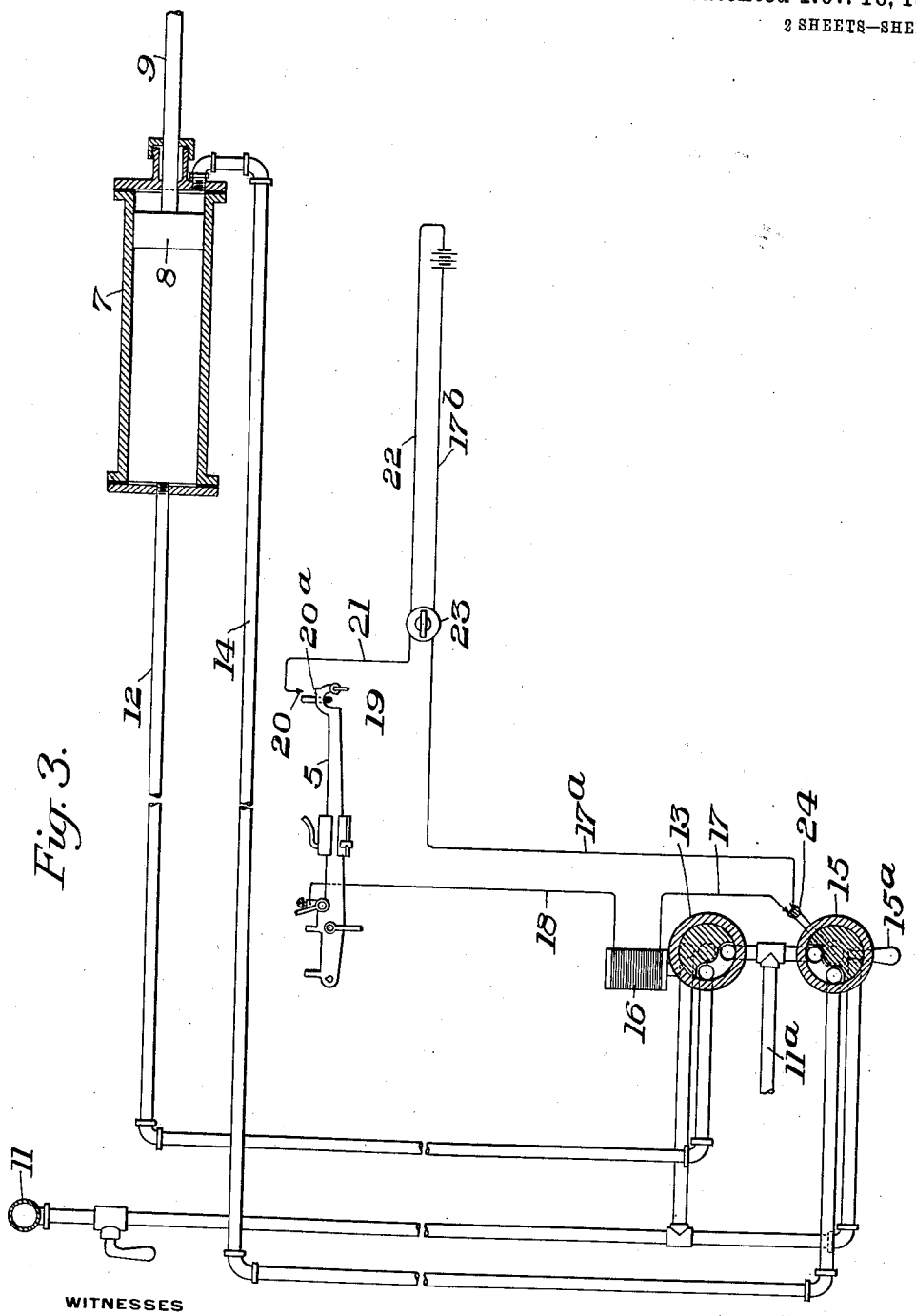

UNITED STATES PATENT OFFICE.

ROBERT W. ROMIG, OF PITTSBURG, PENNSYLVANIA, ASSIGNOR TO THE FAIRBANKS COMPANY, OF NEW YORK, N. Y., A CORPORATION OF NEW JERSEY.

AUTOMATIC CUT-OFF FOR WEIGH-SCALES.

940,616. Specification of Letters Patent. Patented Nov. 16, 1909.

Application filed July 16, 1907. Serial No. 384,048.

*To all whom it may concern:*

Be it known that I, ROBERT W. ROMIG, of Pittsburg, Allegheny county, Pennsylvania, have invented a new and useful Automatic Cut-Off for Weigh-Scales, of which the following is a full, clear, and exact description, reference being had to the accompanying drawings, forming part of this specification, in which—

Figure 1 is a side elevation partly in section of apparatus embodying my invention. Fig. 2 is a detail sectional view of the beam keeper. Fig. 3 is a diagram illustrating the valves and pipe connections to the cylinder, and the various electrical connections.

The object of my invention is to provide an automatic cut-off for weigh-scales which shall be simple and efficient in its action, the cut-off being effected through the movement of the scale beam.

While I have shown my invention as applied for the purpose of cutting off the supply of coal from a hopper or other receptacle to cars upon the scales, it is applicable generally to weighing apparatus where it is desired to deliver a predetermined quantity of material from one receptacle to another, and to automatically cut off the discharge of such material after a predetermined amount has been delivered.

My invention will be best understood by reference to the accompanying drawing which will now be described, it being premised that various changes may be made in the details of construction and arrangement by those skilled in the art, without departing from the spirit and scope of my invention.

The numeral 2 designates the platform of a weigh-scale of any suitable or well-known character, upon which is shown a car 3 which is to receive a predetermined weight of coal from a hopper or other receptacle 4.

5 designates the beam of the scale which is operated in the usual manner by the connections 6 with the platform 2, my invention being independent of any particular character or construction of scale mechanism, except in so far as the features now to be described are concerned.

7 designates a double-acting cylinder, preferably pneumatic, although hydraulic or other fluid power may be employed, whose piston 8 is connected by rod 9 with a gate or shutter 10 which controls the discharge from the bottom of the hopper 4.

11 designates the supply pipe which is connected with a source of pneumatic or other power and which is arranged to be connected with one port of each of valves 13 and 15, which are of any of the well known three-way type. A pipe 12 leads into one end of the cylinder 7 from the valve 13, and a pipe 14 leads to the opposite end of said cylinder from the valve 15.

11$^a$ is an exhaust pipe which is connected to each of the valves 13 and 15. The valve 13 is normally open to exhaust and closed to pressure, but is arranged to be opened to pressure by the action of an electro-magnet 16. One terminal of the winding of this magnet is connected to a wire 17. The other end of this wire is connected to a contact in line of movement with the contact 24 mounted on the hub of an operating handle 15$^a$ of the valve 15. Connected to a similar contact and coacting with the contact 24 is a wire 17$^a$, which passes through a switch 23 to one end of a wire 17$^b$ in the supply circuit. The other terminal of this magnet is connected by wire 18 with a scale beam 5.

The outer end of the scale beam is provided with the contact 20$^a$ which is in line of movement with a similar contact 20 on the beam keeper 19. This contact 20 is connected by a conductor 21 to the other wire 22 of the supply circuit. The bottom of the keeper is provided with an insulating strip on which the beam rests when in the position shown in Fig. 1. 23 is a switch for controlling the circuit to line.

The valve 15 is designed to be manually operated by means of a handle 15$^a$, and when the valve 15 is opened to supply pressure to the cylinder 7, the circuit is opened by means of the contact 24, but when the valve is closed to pressure and the pipe 14 is opened to exhaust, the circuit is closed through the contact 24.

The operation is as follows:—When a sufficient amount of material is delivered into the car 3 to cause the scale beam to rise (this depending upon the weight to which the scale is set), the contact 20$^a$ on the end of the beam engages the contact 20 and thereby completes the circuit to the magnet 16. This opens the valve 13 and admits air to the cylinder 7 to close the gate or shutter 10. As soon as the car 3 is removed from the platform, the scale beam 5 falls, thereby breaking the circuit between contacts 20 and 20ᵃ which will deënergize the magnet 16, and close the valve 13 to pressure and open the pipe 12 to exhaust. When another car is placed upon the scale platform, the valve 15 is opened to admit air, or other fluid pressure, through the pipe 14 to the opposite end of the cylinder 7, and thereby open the gate or shutter 10. The valve is at once reversed to connect pipe 14 with the exhaust and to close the circuit between 17 and 17ᵃ through contact 24 in order that upon the completion of another load the supply of material may be cut off.

It sometimes happens that the gate or shutter 10 will not entirely close, due to the fact that a piece of coal or other material will be caught or wedged by the edge of the gate. In such cases, it is desirable to be able to free such piece by reversing the operation of the cylinder 7. For this reason, the circuit of the magnet 16 is completed through the contact 24 on the hub of the valve operating handle or lever 15ᵃ. In case the gate or shutter 10 does not properly close, by turning the lever 15ᵃ the circuit of the magnet 16 may be opened, thereby closing the admission of air to the cylinder through the pipe 12, and opening the same to exhaust, and admitting air to the opposite end of the cylinder through the pipe 14, to withdraw the shutter 10. The valve 15 is immediately closed to pressure, and opened to exhaust, thereby closing the circuit and allowing the valve 13 to be operated through the medium of the magnet 16 to close the shutter.

My invention provides simple and effective means for automatically operating the cut-off, the only manual operation required being the manipulation of the valve 15 in the manner described.

The invention can be readily applied to scales of any ordinary character at a comparatively low cost, and without material change in the construction thereof.

What I claim is:—

1. In weighing apparatus, a weighing platform, a scale beam, a cut-off device, a power cylinder for controlling the cut-off device, an electro-magnetically actuated valve for admitting power to said cylinder, the circuit of said valve being controlled by the movement of the scale beam, and manually controlled means for causing the reverse operation of the cylinder; substantially as described.

2. In weighing apparatus, a weighing platform, a scale beam, a cut-off device, a double-acting motive cylinder for actuating the cut-off device, a valve for controlling the admission of pressure to one end of said cylinder, electro-magnetic means controlled by the scale beam for opening said valve, and a manually operated device for controlling the admission of pressure to the other end of said cylinder; substantially as described.

3. In weighing apparatus, a gate or cut-off, a cylinder for actuating the same, a valve for admitting power to one end of said cylinder, a magnet for opening said valve, and a second valve and connections for admitting power to the opposite end of the cylinder, said magnet having its circuit opened and closed by the scale beam of the weighing apparatus, and means controlled by the position of the last named valve to also open and close said circuit; substantially as described.

4. In weighing apparatus, a cut-off gate or shutter, a power cylinder for actuating the same, a magnetically actuated valve for controlling the admission of power to one end of said cylinder, and a manually-operated valve for controlling the admission of power to the opposite end of said cylinder, the circuit of the actuating magnet for the first named valve being opened and closed by the position of the scale beam, and means controlled by the position of the manually-operated valve to also open and close said circuit; substantially as described.

In testimony whereof, I have hereunto set my hand.

ROBERT W. ROMIG.

Witnesses:
A. R. RIDGELY,
H. C. BREW.